(12) United States Patent
Moon

(10) Patent No.: US 6,944,123 B1
(45) Date of Patent: Sep. 13, 2005

(54) REDUNDANT PACKET SELECTION AND MANIPULATION IN WIRELESS COMMUNICATIONS SYSTEMS

(75) Inventor: Billy G. Moon, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 851 days.

(21) Appl. No.: 09/814,356

(22) Filed: Mar. 21, 2001

(51) Int. Cl.$^7$ .................. G01R 31/08; G06F 11/00; G08C 15/00; H04J 3/14; H00L 1/00
(52) U.S. Cl. .................. 370/216; 370/229; 370/241; 714/2
(58) Field of Search .................. 370/216, 229, 370/241, 252, 335, 336, 429, 329, 342, 332, 370/320, 441, 60, 94.1, 310.2, 331, 401, 370/260, 338, 395.1, 328, 310, 267, 268; 455/452.2, 524, 525, 226.2, 226.3, 436–439, 455/456.5, 456.6, 115.3, 132–138, 517, 428, 455/432.1, 553.1; 714/2, 752, 746, 747

(56) References Cited

U.S. PATENT DOCUMENTS

| | | | |
|---|---|---|---|
| 4,550,443 A | 10/1985 | Freeburg | 455/33 |
| 5,355,367 A * | 10/1994 | Comroe et al. | 370/329 |
| 5,410,732 A | 4/1995 | Ames et al. | 455/33.1 |
| 5,491,688 A | 2/1996 | Bocci et al. | 370/18 |
| 5,719,871 A | 2/1998 | Helm et al. | 370/479 |
| 5,794,149 A | 8/1998 | Hoo | 455/438 |
| 5,850,607 A | 12/1998 | Muszynski | 455/442 |
| 5,867,491 A | 2/1999 | Derango et al. | 370/329 |
| 5,920,817 A | 7/1999 | Umeda et al. | 455/437 |
| 5,999,815 A * | 12/1999 | TenBrook et al. | 455/436 |
| 6,038,452 A | 3/2000 | Strawczynski et al. | 455/446 |
| 6,044,270 A | 3/2000 | Raith | 455/434 |
| 6,058,107 A * | 5/2000 | Love et al. | 370/332 |
| 6,069,885 A * | 5/2000 | Fong et al. | 370/336 |
| 6,151,502 A | 11/2000 | Padovani et al. | 455/442 |
| 6,222,830 B1 * | 4/2001 | Padovani et al. | 370/332 |
| 6,233,454 B1 | 5/2001 | Sato | 455/437 |
| 6,262,980 B1 * | 7/2001 | Leung et al. | 370/336 |
| 6,263,204 B1 | 7/2001 | Kusaki et al. | 455/439 |
| 6,295,450 B1 * | 9/2001 | Lyer et al. | 455/436 |
| 6,348,880 B1 | 2/2002 | Xu | 341/50 |
| 6,359,877 B1 | 3/2002 | Rathonyi et al. | 370/349 |
| 6,442,401 B1 * | 8/2002 | Behan | 455/552.1 |
| 6,496,700 B1 | 12/2002 | Chawla | 455/456 |
| 6,516,196 B1 * | 2/2003 | Chen et al. | 455/450 |

(Continued)

OTHER PUBLICATIONS

U.S. Appl. No. 09/670,055 filed Sep. 25, 2000, entitled "Packet Voting in Wireless Communications Systems," 39 total pages.

(Continued)

*Primary Examiner*—Wellington Chin
*Assistant Examiner*—Jamal A. Fox
(74) *Attorney, Agent, or Firm*—Baker Botts L.L.P.

(57) ABSTRACT

A communications system includes a mobile unit that transmits content and a number of base transceiver stations that receive the content from the mobile unit. Each base transceiver station determines a value for a metric associated with communications between the mobile unit and the base transceiver station, generates a graded packet including the value and the content, and communicates the graded packet. The system also includes a router that receives the graded packets, combines different portions of the content from each of two or more of the graded packets to create an improved packet, and communicates the improved packet. The different portions from the graded packets collectively represent the entirety of the content such that the improved packet includes the entirety of the content.

5 Claims, 7 Drawing Sheets

U.S. PATENT DOCUMENTS

| | | | |
|---|---|---|---|
| 6,535,738 B1 | 3/2003 | Bomar et al. | 455/436 |
| 6,549,542 B1 | 4/2003 | Dong et al. | 370/441 |
| 6,570,871 B1 | 5/2003 | Schneider | 370/356 |
| 6,594,229 B1 * | 7/2003 | Gregorat | 370/219 |
| 6,603,751 B1 | 8/2003 | Odenwalder | 370/331 |
| 6,611,513 B1 | 8/2003 | ten Brink | 370/342 |
| 6,628,632 B1 | 9/2003 | Dolan | 370/332 |
| 6,647,262 B1 | 11/2003 | Demetrescu et al. | 455/436 |
| 6,691,273 B2 * | 2/2004 | Wager et al. | 714/751 |
| 6,697,642 B1 | 2/2004 | Thomas | 455/562.1 |
| 6,728,296 B1 * | 4/2004 | Yung | 375/141 |
| 6,785,254 B2 | 8/2004 | Korus et al. | 370/338 |
| 2001/0008522 A1 * | 7/2001 | Padovani et al. | 370/332 |
| 2001/0034237 A1 | 10/2001 | Garahi | 455/456 |
| 2002/0027890 A1 * | 3/2002 | Bernstein et al. | 370/331 |
| 2002/0058481 A1 | 5/2002 | Mohebbi | 455/67.1 |
| 2002/0075889 A1 * | 6/2002 | Rong et al. | 370/429 |
| 2002/0095635 A1 * | 7/2002 | Wager et al. | 714/746 |
| 2002/0110088 A1 * | 8/2002 | Lundby et al. | 370/252 |
| 2002/0114332 A1 * | 8/2002 | Apostolopoulos et al. | 370/392 |
| 2002/0118665 A1 * | 8/2002 | Cleveland et al. | 370/342 |
| 2003/0063582 A1 | 4/2003 | Mizell et al. | 370/328 |
| 2003/0195001 A1 | 10/2003 | Tari et al. | 455/435.2 |

OTHER PUBLICATIONS

U.S. Appl. No. 09/670,056 filed Sep. 25, 2000, entitled "*Packet Voting in Wireless Mobile Devices,*" 38 total pages.

U.S. Appl. No. 09/669,098 filed Sep. 25, 2000, entitled "*Generating Graded Packets for Packet Voting in Wireless Communications Systems,*" 36 total pages.

U.S. Appl. No. 09/814,609 filed Mar. 21, 2001, entitled "*Error Correction Using Redundant Packet Streams In Wireless Communications Systems,*" 44 total pages.

U.S. Appl. No. 09/814,374 filed Mar. 21, 2001, entitled "*Improved Decoding Using Redundant Packet Selection Information in Wireless Communications Systems,*" 45 total pages.

U.S. Appl. No. 09/814,285 filed Mar. 21, 2001, entitled "*Redundant Packet Selection Based on Packet Content in Wireless Communications Systems,*" 46 total pages.

Van Nobelen, "*An Adaptive Radio Link Protocol with Enhanced Data Rates for GSM Evolution,*" IEEE Personal Communications, Feb. 1999, pp. 54-63.

Van Nobelen, "*An Adaptive Radio Link Protocol with Enhanced Data Rates for GSM Evolution,*" IEEE Personal Communications, Feb. 1999, pp. 54-63.

* cited by examiner

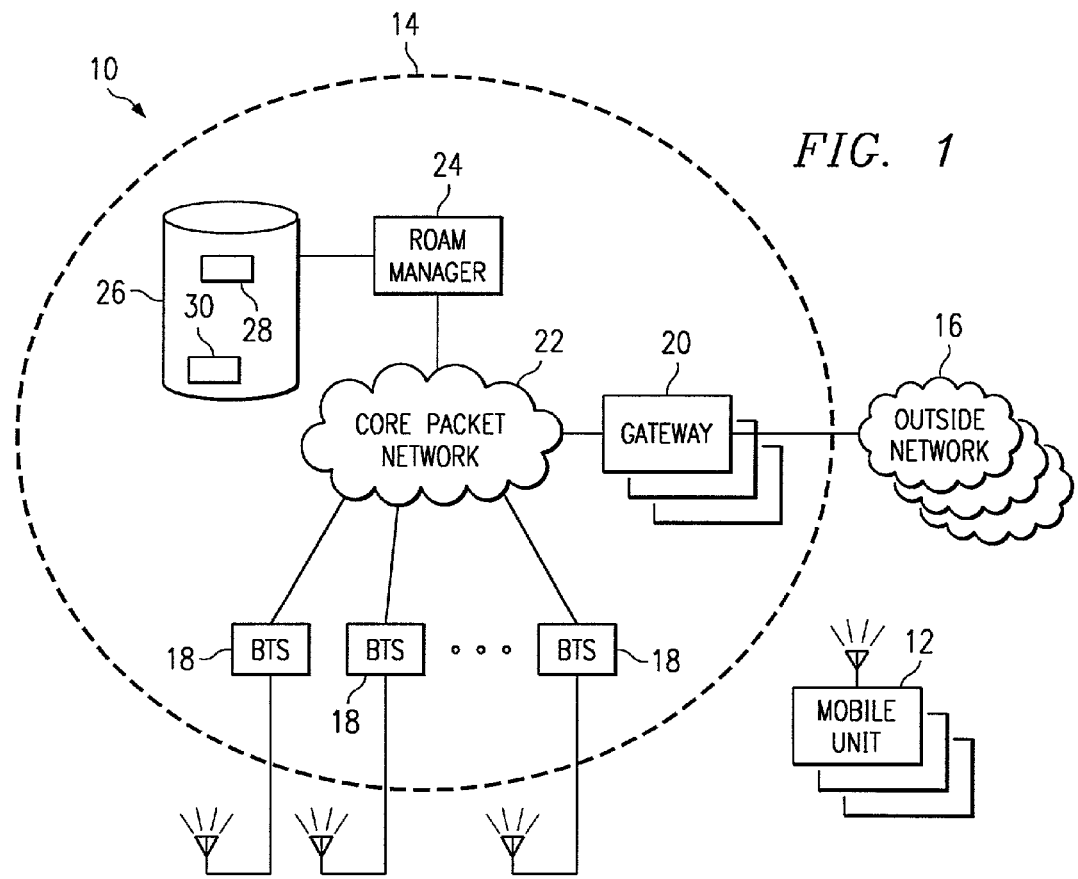

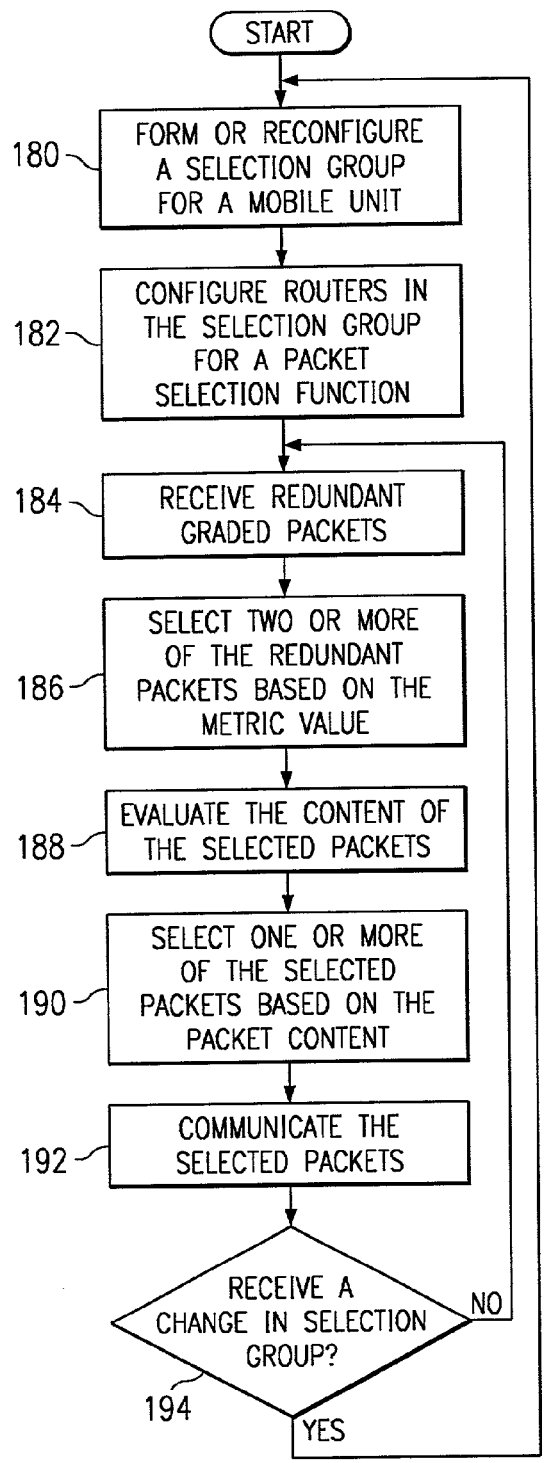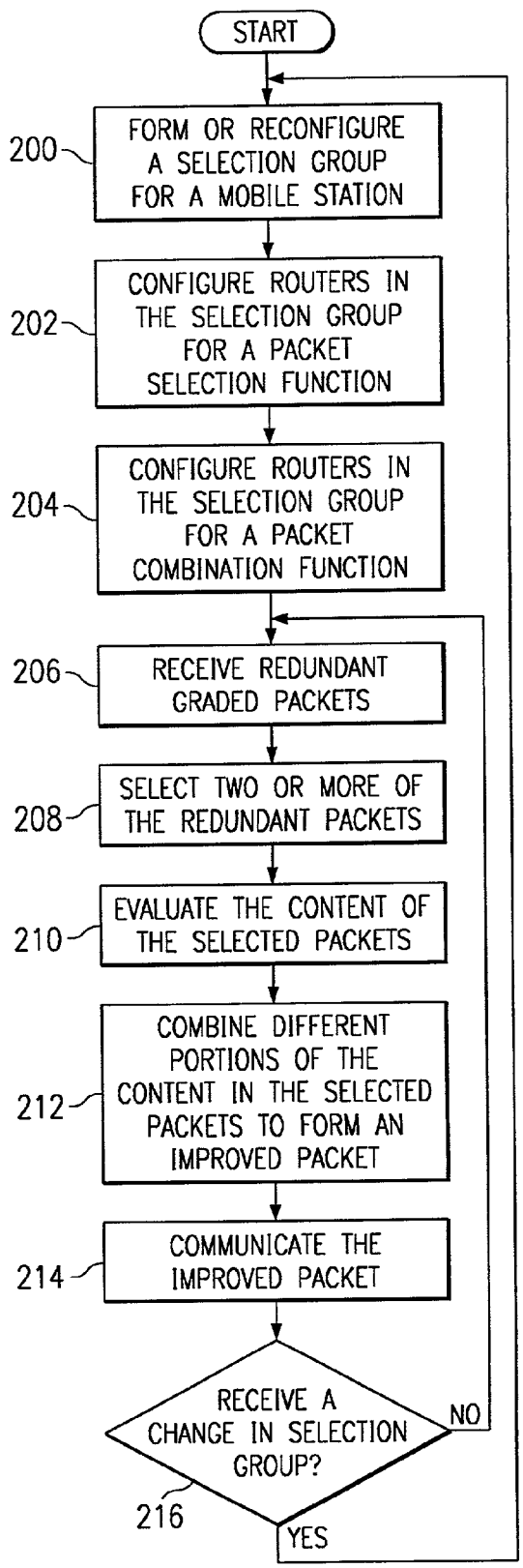

REDUNDANT PACKET SELECTION AND MANIPULATION IN WIRELESS COMMUNICATIONS SYSTEMS

CROSS-REFERENCE TO RELATED APPLICATIONS

This application is related to U.S. application Ser. No. 09/814,609 entitled "Error Correction Using Redundant Packet Streams in Wireless Communications Systems," which was filed on Mar. 21, 2001 by Billy G. Moon; U.S. application Ser. No. 09/814,374, entitled "Improved Decoding Using Redundant Packet Selection Information in Wireless Communications Systems," which was filed on Mar. 21, 2001 by Billy G. Moon; and U.S. application Ser. No. 09/814,285 entitled "Redundant Packet Selection Based on Packet Content in Wireless Communications Systems," which was filed on Mar. 21, 2001 by Billy G. Moon.

TECHNICAL FIELD OF THE INVENTION

The present invention relates generally to wireless communications and more particularly to redundant packet selection and manipulation in wireless communications systems.

BACKGROUND OF THE INVENTION

Typical cellular systems include base transceiver stations that provide wireless communications for cellular phones. These base transceiver stations connect to base station controllers and transmit phone calls and other data using circuit-switched, time division multiplexed core network. The connections between base transceiver stations and base station controllers typically support multiple communications sessions by assigning each session to a particular time-slot within frames. Thus, multiple cell phones may simultaneously establish communications sessions via one base transceiver station, and the base transceiver station uses different time-slots for each session. The management and assignment of time-slots often requires complex algorithms making tradeoffs based on a variety of factors. As the number of cell phones increases in a given area, proper management of time-slots becomes critical.

The roaming of a cell phone between base transceiver stations during a communications session exacerbates problems in time-slot management. An established session roaming to a new base transceiver station typically requires a similar time-slot on both the original and the new base transceiver station. Therefore, time division multiplexed connections may result in inefficient use of bandwidth between base transceiver stations and base station controllers and introduces complexity to time-slot management and roaming decisions for cell phones.

SUMMARY OF THE INVENTION

In accordance with the present invention, techniques for redundant packet selection and manipulation in wireless communications systems are provided which substantially eliminate or reduce disadvantages and problems associated with previous techniques.

According to one embodiment of the present invention, a communications system includes a mobile unit that transmits content and a number of base transceiver stations that receive the content from the mobile unit. Each base transceiver station determines a value for a metric associated with communications between the mobile unit and the base transceiver station, generates a graded packet including the value and the content, and communicates the graded packet. The system also includes a router that receives the graded packets, combines different portions of the content from each of two or more of the graded packets to create an improved packet, and communicates the improved packet. The different portions from the graded packets collectively represent the entirety of the content such that the improved packet includes the entirety of the content.

According to another embodiment of the present invention, a communications system includes a first mobile unit that transmits a first content and a second mobile unit that transmits a second content. The system also includes a number of base transceiver stations that receive the content from at least one of the mobile units, determine a value for a metric associated with communications between the mobile unit and the base transceiver station, generate a graded packet including the value and the content, and communicate the graded packet. The system further includes one or more routers that collectively receive a number of first graded packets including the first content and a number of second graded packets including the second content. The routers also select one of the first graded packets based on the values included in the first graded packets and select one of the second graded packets based on the values included in the second graded packets. Furthermore, the routers mix the first content of the selected first graded packet and the second content of the selected second graded packet to create a mixed packet including the first and second contents and communicate the mixed packet.

The present invention provides a number of technical advantages. For example, embodiments of the present invention include a packet-switched core that replaces the circuit-switched core typically used by cellular systems. This packet-switched core enables more efficient use of resources and eliminates complexity associated with the management of time-slots. Embodiments of the present invention also implement packet voting procedures in the packet-switched core that enable more efficient roaming of mobile units between base transceiver stations. These procedures enable the packet-switched network to intelligently select between copies of packets from a mobile unit received by multiple base transceiver stations. Each base transceiver station may encode metrics within received packets to facilitate selection between multiple copies of a single packet. Furthermore, a hierarchical voting structure may be used to distribute selection decisions and to reduce the propagation of redundant packets.

The redundant packet streams used with packet voting procedures also enable routers or other network devices to combine portions of redundant packets to create an improved packet. For example, if error is introduced during transmission in one portion of a first packet and error is also introduced in a different portion of a second packet, then the unaltered portions of the packets may be combined to create an improved packet with fewer or no errors. Furthermore, packets in redundant packet streams from different sources may be combined by network devices to conferencing of signals from the multiple sources. For example, devices in a communications system may select between packets from multiple participants in a conference call based on content encoded within each packet and/or based on the value of a metric included in the packets. With packet voting, conferencing decisions may be distributed among many devices, without requiring a centralized conference host to select between signals from the participants. Also, systems may use packet voting to provide multiple redundant links between two points. For example, to guarantee a quality connection between two points, the system may provide parallel communications paths and vote between copies of packets based on encoded metrics. Other technical advantages of the present invention will be readily apparent to one skilled in the art from the following figures, descriptions and claims.

BRIEF DESCRIPTION OF THE DRAWINGS

For a more complete understanding of the present invention and its advantages, reference is now made to the following descriptions, taken in conjunction with the accompanying drawings, in which:

FIG. 1 illustrates an exemplary communications system having a core packet network supporting wireless communications with mobile units;

FIG. 2 illustrates an exemplary table maintaining exemplary information for determining candidate base transceiver stations for roaming from a primary base transceiver station;

FIG. 3 illustrates an exemplary table maintaining exemplary information for monitoring communications with a mobile unit and for selecting between candidate base transceiver stations during roaming;

FIG. 8 illustrates an exemplary method of selecting one or more packets based on an expected content or based on the relative content of the packets;

FIG. 9 illustrates an exemplary method of creating an improved packet from two or more redundant packets.

DETAILED DESCRIPTION OF THE DRAWINGS

Figure 4:
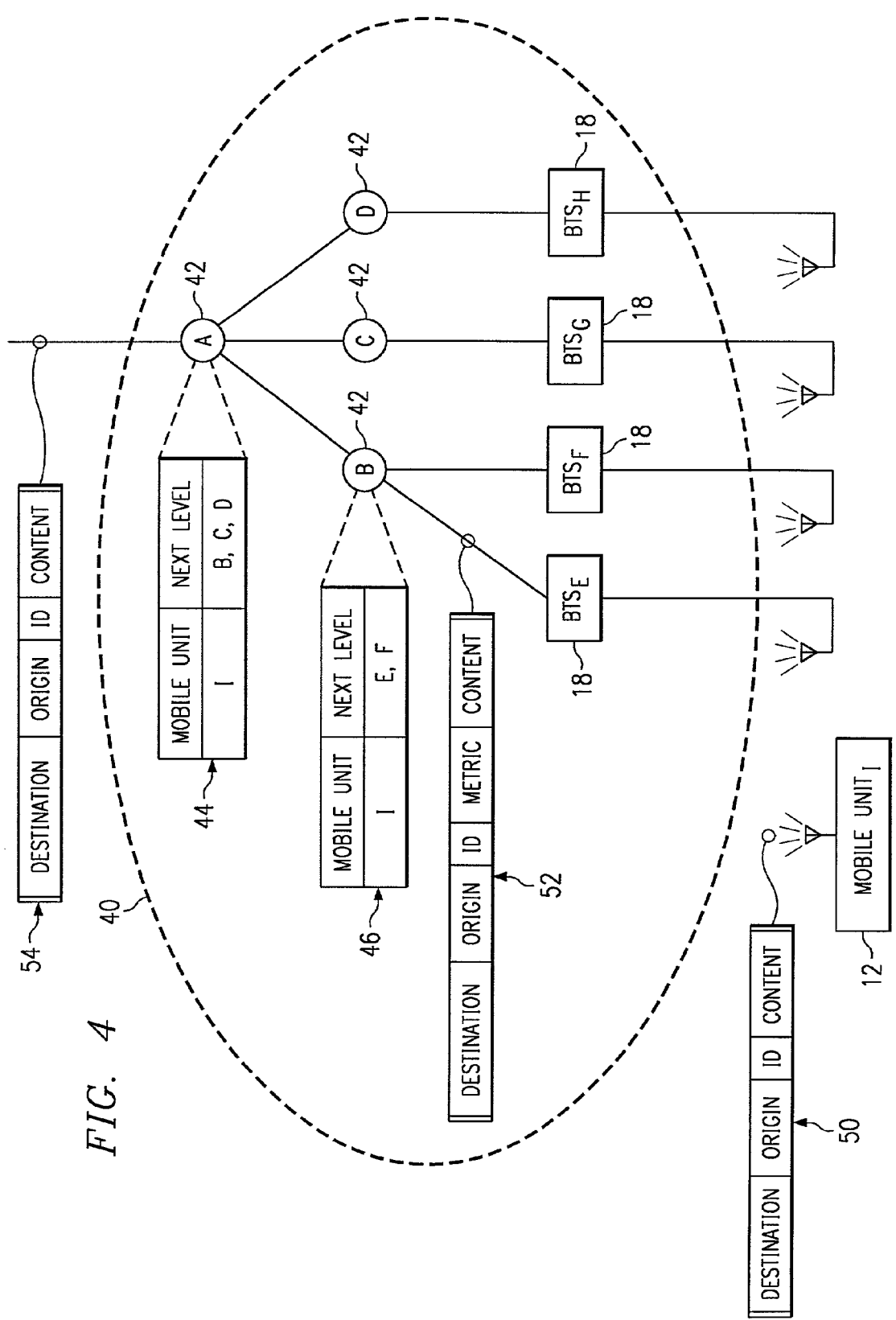
FIG. 4 illustrates an exemplary hierarchical selection group for communicating packets received from a mobile unit by multiple base transceiver stations.

FIG. 1 illustrates an exemplary communications system, indicated generally at 10, that includes mobile units 12 coupled via wireless links to a managed network 14 that may be coupled to outside networks 16. Managed network 14 includes base transceiver stations 18, gateways 20, a core packet network (CPN) 22, and a roam manager 24. In general, mobile unit 12 establishes a wireless link with one or more transceiver stations 18 to communicate with other mobile units 12 or with devices coupled to outside networks 16. Managed network 14 supports packet voting between multiple copies of each packet received from mobile unit 12. More specifically, CPN 22 may select between copies of a packet received from mobile unit 12 by multiple transceiver stations 18, and gateway 20 may forward a selected one of the copies to an appropriate outside network 16.

Mobile units 12 provide wireless communications using any suitable wireless communications protocol and may establish wireless links with transceiver stations 18 in managed network 14. For example, mobile unit 12 may be analog or digital cellular telephones, personal digital assistants (PDAs), pagers, or other suitable wireless devices providing wireless services for subscribers. Wireless links represent any channel or channels established between devices for the persistent, periodic, or sporadic communication of information via any suitable wireless communications protocols. Managed network 14 represents any collection and arrangement of components each aware of the topology within managed network 14. That is, each component of managed network 14 may access information describing the network layout for other components of managed network 14. This information may include network addresses, routing tables, or other suitable information. Thus, for example, if managed network implements Internet Protocol (IP) communications, each component of managed network 14 may be aware of the IP addresses for other components in managed network 14.

Transceiver stations 18 represent hardware and/or software supporting wireless links with mobile units 12 using any suitable wireless communications protocol. Transceiver stations 18 receive content from mobile units 12 in packets or receive content from mobile units 12 and packetize the content for packet-switched communication via CPN 22. The content may be voice, video, audio, data, or any other appropriate type of information. CPN 22 represents any collection and arrangement of hardware and/or software providing packet-switched communications between transceiver stations 18, gateways 20, and roam managers 24. For example, CPN 22 may include routers, bridges, gateways, switches, or other suitable network equipment providing packet-switched communications.

Gateways 20 represent hardware and/or software linking managed network 14 to outside networks 16, such as mobile switching centers (MSCs), network gateways, or other suitable equipment. For example, gateways 20 may link to the public switched telephone network (PSTN), a global computer network such as the Internet, local area networks (LANs), wide area networks (WANs), or other communications networks. Moreover, gateways 20 may support conversions between the packet-switched communications supported by CPN 22 and protocols used by outside networks 16. For example, gateway 20 may communicate with CPN 22 using packet-switched protocols while providing circuit-switched communications with selected outside networks 16.

Roam manager 24 represents hardware and/or software that monitors, manages and controls wireless links between mobile units 12 and transceiver stations 18. As part of this management and control, roam manager 24 facilitates the roaming of mobile units 12 between transceiver stations 18. Roaming refers to any activities supporting communications between mobile unit 12 and multiple transceiver stations 18 or supporting movement of mobile units 12 between areas serviced by different transceiver stations 18 or other wireless services equipment. Therefore, roam manager 24 supports management and control of links between mobile units 12 and transceiver stations 18 to provide substantially uninterrupted wireless services. While roam manager 24 is illustrated as a separate component of managed network 14, system 10 contemplates incorporating the functionalities of roam manager 24 into any suitable components. For example, devices in CPN 22, gateways 20, transceiver stations 18, mobile units 12 and/or other suitable equipment may provide some or all of the functions of roam manager 24. Moreover, any of the functionalities of roam manager 24 may be separated and distributed among components of system 10 and may be implemented using any suitable combination of hardware and/or software.

To facilitate management and control of roaming of mobile units 12, roam manager 24 may access information stored in a memory 26. Memory 26 represents any one or combination of volatile or non-volatile, local or remote devices suitable for storing data, for example, random access memory (RAM) devices, read only memory (ROM) devices, magnetic storage devices, optical storage devices, or any other suitable data storage devices. In a particular embodiment, memory 26 stores a candidate table 28 and a link table 30. Candidate table 28 maintains information for selecting candidate transceiver stations 18 for roaming from an original transceiver station 18, and link table 30 maintains information for monitoring wireless links between transceiver stations 18 and mobile units 12.

In operation, mobile unit 12 establishes a communications session with a remote location via a wireless link with a selected transceiver station 18 in managed network 14. The communications session may use any suitable connection-oriented or connection-less, synchronous or asynchronous protocols. Establishing the session may result from mobile unit 12 initiating a telephone call, receiving a telephone call, establishing a data session, transmitting or receiving a page, roaming into an area, or any other suitable event. Transceiver station 18 monitors the wireless link and communicates information describing the link to roam manager 24. These communications include any information describing the link, such as signal strength, bit error rate (BER), carrier-to-noise ratio (CNR), signal-to-noise ratio (SNR), or other suitable metrics. Roam manager 24 may maintain this information using link table 30. During the communications session, CPN 22 routes packets associated with the session to an appropriate gateway 20. However, if the remote location is serviced by a selected transceiver station 18 in managed network 14, then CPN 22 may stream packets between transceiver station 18 communicating with mobile unit 12 and transceiver station 18 communicating with the remote location.

Roam manager 24 monitors the link based on information received from transceiver station 18 and, if an appropriate trigger occurs, initiates roaming of mobile unit 12. For example, transceiver station 18 may report signal strength to roam manager 24, and, when the signal strength drops below a threshold, roam manager 24 initiates roaming of mobile unit 12. Given an appropriate triggering event, roam manager 24 determines candidate transceiver stations 18 for roaming. Candidate transceiver stations 18 include potential stations for establishing a new wireless link with mobile unit 12. Roam manager 24 may determine candidate transceiver stations 18 based on the original transceiver station 18, for example, by determining transceiver stations 18 in areas adjacent to the original transceiver station 18. In a particular embodiment, roam manager 24 accesses candidate table 28 to determine candidate transceiver stations 18 based on the original transceiver station 18. However, system 10 contemplates roam manager 24 using any suitable techniques or information for determining candidate transceiver stations 18 for roaming.

After determining candidate transceiver stations 18, roam manager 24 directs the establishment of links between candidate transceiver stations 18 and mobile unit 12. This may include instructing candidate transceiver stations 18 to communicate with mobile unit 12 using appropriate protocols and similarly instructing mobile unit 12 to communicate with candidate transceiver stations 18. For example, consider mobile unit 12 roaming in a system using Walsh code/frequency combinations (typical of code division multiple access (CDMA) systems) for wireless links between mobile unit 12 and transceiver stations 18. To set up links between mobile unit 12 and multiple candidate transceiver stations 18, roam manager 24 may instruct candidate transceiver stations 18 to send outbound packets to mobile unit 12 using particular Walsh code/frequency combinations and to receive inbound packets from mobile unit 12 using a separate Walsh code/frequency combination. In addition, roam manager 24 may instruct mobile unit 12 to receive packets from candidate transceiver stations 18 using the specified Walsh code/frequency combinations. This establishes multiple, parallel, wireless links between mobile unit 12 and transceiver stations 18. Therefore, each candidate transceiver station 18 and the original transceiver station 18 may receive a copy of each packet transmitted by mobile unit 12, and mobile unit 12 may receive packets from each candidate transceiver station 18 and the original transceiver station 18. While this example focuses on specific protocols, system 10 contemplates mobile units 12 and transceiver stations 18 establishing wireless links using any suitable communications protocols. Moreover, while this example includes mobile unit 12 establishing a single link and then roaming between a group of transceiver stations 18, system 10 contemplates mobile unit 12 continuously roaming between multiple transceiver stations 18.

In addition to directing communications between transceiver stations 18 and mobile unit 12, roam manager 24 may also establish a selection group associated with the communications session to aid in streaming multiple copies of inbound and outbound packets through managed network 14. For example, managed network 14 may use the selection group to select from multiple copies of each inbound packet received from mobile unit 12 and to distribute copies of each outbound packet to transceiver stations 18 communicating with mobile unit 12. To establish the selection group, roam manager 24 may include the original transceiver station 18 providing a wireless link to mobile unit 12 and candidate transceiver stations 18.

After determining transceiver stations 18 in the selection group, roam manager 24 propagates this selection group information to devices in managed network 14, including components of CPN 22. This propagation establishes a hierarchy for selecting between multiple copies of each packet received by transceiver stations 18 in the selection group. As previously discussed, during roaming of mobile unit 12, each transceiver station 18 in the selection group receives a copy of each packet transmitted by mobile unit 12. The selection group hierarchy provides a mechanism for selecting one of the copies of each packet transmitted by mobile unit 12 to communicate to the remote location.

In addition, devices in managed network 14 may use this selection group hierarchy to control the distribution of outbound packets (packets from the remote location to mobile unit 12). For example, the selection group hierarchy may fan out a single packet from the remote location, resulting in each transceiver station 18 in the selection group receiving a copy of the packet. Each transceiver station 18 in the selection group then transmits its copy of the packet to mobile unit 12, allowing mobile unit 12 to select the best available packet or otherwise combine or select from multiple copies of each packet received. Therefore, managed network 14 may use the selection group to aid in distribution of copies of outbound packets and to enable hierarchical packet voting resulting in a single copy of each inbound packet reaching the remote location.

To aid in this packet voting, components in system 10 encode metrics or other information in each inbound packet to enable selection between multiple copies of each inbound packet. In a particular embodiment, transceiver stations 18 determine a metric associated with each packet received from mobile unit 12 and generate a graded packet encoding this metric and the contents of the original packet. Transceiver stations 18 generate graded packets using any metric or metrics, such as signal strength, BER, CNR, SNR, or other suitable metrics. Thus, components in managed network 14 differentiate between copies of each packet based on the metrics or other information encoded in the graded packets. This allows a component receiving multiple copies of a packet, as graded packets, to intelligently select one or more of the graded packets to forward.

For example, consider mobile unit 12 communicating with two transceiver stations 18 of a selection group. Each transceiver station 18 receives a copy of an inbound packet, determines a metric associated with the wireless link to mobile unit 12, generates a graded packet encoding this metric and the inbound packet, and forwards the graded packet to CPN 22. An element of CPN 22 (or gateway 20) receives the two graded packets, selects one of the packets based on the encoded metrics, and then forwards the selected packet. Thus, managed network 14 votes between multiple copies of a packet based on encoded metrics. System 10 contemplates using any suitable metrics or techniques for selecting between multiple copies of a packet. Furthermore, while these examples focus on wireless communications applications, similar techniques and methods may be used for other applications that may benefit from packet voting, such as conferencing or collaboration over wireless or wireline networks.

During roaming, roam manager 24 may also monitor wireless links between roaming mobile units 12 and transceiver stations 18 to determine when to terminate roaming and remove selection groups. In a particular embodiment, transceiver stations 18 monitor wireless links with mobile units 12, generate monitoring information, and communicate monitoring information to roam manager 24. For example, each transceiver station 18 continuously, periodically, or sporadically communicates values for metrics measuring characteristics associated with wireless links between that transceiver station 18 and mobile units 12. Monitoring information may include any suitable metrics, such as signal strength, BER, CNR, and SNR. Memory 26 may store monitoring information in link table 30. Based on this and/or other information, roam manager 24 determines when to terminate roaming and remove selection groups for mobile units 12. For example, roam manager 24 may monitor each wireless link for mobile unit 12 communicating with multiple transceiver stations 18. When one of the links meets certain criteria, roam manger 24 may terminate roaming and remove the selection group associated with that mobile unit 12, allowing mobile unit 12 to continue wireless communications with a selected primary transceiver station 18.

System 10 contemplates roam manager 24 using any suitable techniques and information for determining when to terminate roaming of mobile units 12 and to remove selections groups. Moreover, roam manager 24 may support "soft" roaming of mobile units 12. In soft roaming, roam manager 24 adds and removes transceiver stations 18 from the selection group at any time without terminating the selection group. Thus, roam manager 24 may continuously maintain a selection group for mobile unit 12, modifying the membership of the group as appropriate.

To terminate roaming, roam manager 24 suspends communications between mobile unit 12 and transceiver stations 18 in the selection group not selected as the primary transceiver station 18. In a particular embodiment, roam manager 24 instructs the non-primary transceiver stations 18 to stop communicating outbound packets to mobile unit 12 and to stop receiving inbound packets from mobile unit 12, and roam manager 24 instructs mobile unit 12 to stop receiving packets from the non-primary transceiver stations 18. This results in a single wireless link between mobile unit 12 and primary transceiver station 18. In addition to terminating roaming, roam manager 24 may also remove the selection group associated with mobile unit 12. For example, roam manager 24 issues a command to elements in managed network 14 requesting all elements to stop streaming packets according to the selection group. As a result, managed network 14 discontinues packet voting according to the selection group hierarchy and discontinues copying of outbound packets to multiple transceiver stations 18. While the preceding examples illustrate particular embodiments, system 10 contemplates roam manager 24 using any appropriate techniques for terminating roaming of mobile units 12 and for removing selection groups.

Moreover, managed network 14 may implement soft roaming using dynamic selection groups and, as previously discussed, may distribute selection group and roaming management among components in system 10. For example, each transceiver station 18 may monitor signals from mobile units 12, such as communications control signals, to determine mobile units 12 within an effective range of that transceiver station 18. This includes, for example, transceiver station 18 determining all mobile units 12 that have a signal strength that exceeds a threshold.

Based on these determinations, each transceiver station 18 registers with selection groups for mobile units 12 within range and drop from selection groups for mobile units 12 that have moved out of range. Furthermore, mobile units 12 may monitor signals and add or remove transceiver stations 18 from selection groups. This provides selection groups that dynamically add and remove members based on distributed management. However, system 10 contemplates managed network 14 using any distribution or centralization of roaming and selection group management functions.

FIG. 2 illustrates an exemplary candidate table 28 maintained by memory 26. Candidate table 28 includes entries for candidate transceiver stations 18 indexed according to a primary transceiver station 18. Elements in system 10, such as roam manager 24, may use information in candidate table 28 to aid in managing and controlling roaming of mobile units 12 and in establishing selection groups. This exemplary candidate table 28 lists candidate transceiver stations 18 for two primary transceiver stations 18, stations E and F. For example, consider mobile unit 12 participating in a communication session using a wireless link with station E. Roam manager 24, monitoring this link, may determine that mobile unit 12 should roam between transceiver stations 18. Roam manager 24 accesses candidate table 28 and determines that mobile units 12 roaming from station E potentially roam to stations F, G, or H. Based on this determination, roam manager 24 establishes a selection group including stations E, F, G, and H and initiates roaming of mobile unit 12. Candidate table 28 illustrates only a particular embodiment for maintaining candidate information. System 10 contemplates using any suitable information maintained in any appropriate form for assisting with roaming decisions.

FIG. 3 illustrates an exemplary link table 30 maintained by memory 26. Roam manager 24 may access link table 30 to determine appropriate times for initiating and terminating roaming of mobile units 12. For each mobile unit 12 monitored by roam manager 24, link table 30 maintains monitoring information for wireless links between transceiver stations 18 and mobile units 12. This information includes any suitable metrics, reports, or other data, such as signal strength, BER, CNR, SNR, or other suitable information. This exemplary link table 30 illustrates link information for two mobile units 12, mobile units I and K. For example, link table 28 indicates that mobile unit I is currently communicating with stations E, F, G, and H. These transceiver stations 18 may represent members of a selection group established by roam manager 24 to facilitate roaming of mobile unit I. Table 30 also indicates that mobile unit K is currently communicating with station F. Thus mobile unit K, in this example, is not currently roaming. While this example includes specific metrics monitored by roam manager 24, system 10 contemplates roam manager 24 monitoring and link table 30 maintaining any suitable metrics for determining characteristics of wireless links between mobile units 12 and transceiver stations 18.

FIG. 4 illustrates an exemplary selection group hierarchy 40 established within managed network 14 that includes routers 42 and transceiver stations 18 for a selection group associated with mobile unit 12. Hierarchy 40 illustrates the operation of components in managed network 14 in accordance with an exemplary selection group hierarchy. In general, elements in hierarchy 40 may stream inbound and outbound packets associated with a communications session according to a selection group established for mobile unit 12. Routers 42 select between copies of inbound packets at each juncture, and thus hierarchy 40 may ultimately forward a single copy of each inbound packet from mobile unit 12. Hierarchy 40 may also generate multiple copies of outbound packets such that each transceiver station 18 receives copies of each outbound packet destined to mobile unit 12.

Routers 42 represent hardware and/or software components in managed network 14 that receive and forward packets and select between multiple copies of packets. For example, routers may be gateways 20, elements of CPN 22, or other suitable devices. Routers 42 may include an interface for communicating with other elements in system 10 and a processor for controlling the operation of router 42. These components may be implemented using any suitable combination or separation of modules using hardware and/or software components.

This illustration includes exemplary network addresses for each element. Thus, routers 42 have network addresses A, B, C, and D, transceiver stations 18 have network addresses E, F, G, and H, and mobile unit 12 has a network address of I. In addition, this example includes selection group information for various routers 42 illustrated as a first selection table 44 (maintained by router A) and a second selection table 46 (maintained by router B). Tables 44 and 46 each identify a mobile unit 12 associated with the selection group (mobile unit I) and network addresses for devices in the next lower level of hierarchy 40. For each inbound packet, routers 42 select from copies of the packet received from each device on the next lower level. For example, router A selects between copies of inbound packets received from routers B, C, and D. Similarly, router B selects between copies of packets received from stations E and F. Some elements of hierarchy 40, such as routers C and D, may simply forward packets without selecting between multiple copies.

Consider an inbound packet 50 transmitted by mobile unit I. In this example, packet 50 includes an origin, destination, identifier (ID), and content. The identifier may include a sequence number or other information for identifying the packet. Stations E, F, G, and H each receive a copy of packet 50, determine a metric associated with the wireless communications link with mobile unit I, generate a graded packet encoding the metric and information from the original inbound packet, and then forward the graded packet up hierarchy 40. For example, station E receives packet 50, determines a metric associated with communications between station E and mobile unit I, generates a graded packet 52 encoding this metric and information from the inbound packet, and forwards graded packet 52 to router B. Therefore, in this example, graded packet 52 includes the origin, destination, ID, and content of packet 50 as well as an encoded metric. Station F performs similar functions upon receiving the inbound packet. Routers 42 determine the group of graded packets from which to select based on the identifiers encoded in the packets. This group of graded packets may be referred to as "redundant" packets. However, it should be understood that due to transmission or other errors, redundant packets may not be identical when received by a router 42 or other appropriate device (thus the need for packet selection).

Router B receives graded packets from stations E and F, selects one of these packets based on the encoded metrics, and forwards the selected graded packet to router A. Routers C and D simply forward graded packets received from stations G and H to router A. At the final selection point, router A receives graded packets from routers B, C, and D, selects between these graded packets based on the encoded metrics, and forwards a selected packet 54. Therefore, hierarchy 40 may support a distributed selection process that allows mobile unit 12 to communicate with multiple transceiver stations 18 and provides intelligent selection between redundant packets received using multiple wireless links.

Using these techniques, hierarchy 40 may select the copy of each inbound packet with the highest potential for quality. For example, transceiver stations 18 may grade packets based on a signal strength associated with communications with mobile unit 12 while receiving the packet. Hierarchy 40 may then select between redundant packets based on signal strength and, for each inbound packet, forward the copy received on the wireless link having the highest signal strength for copies of that packet. In addition, hierarchy 40 may remove any metrics from the final packet selected. For example, router A may remove any metrics from the final selected packet, thus forwarding a single packet identical to the original packet transmitted by mobile unit I. Hierarchy 40 illustrates this, having selected packet 54 identical to packet 50 transmitted by mobile unit I.

While this example illustrates specific network elements and techniques for selecting between packets from multiple transceiver stations 18, system 10 contemplates using any suitable methods and criteria for selecting between multiple copies of a single packet (redundant packets). Moreover, these selection techniques may be used in any system requiring selection between copies of packets. For example, similar selection techniques may be used to establish multiple parallel paths for communications between two points or to facilitate conferencing functions.

Also, while this example focuses on packet-based communication between transceiver station 18 and mobile unit 12, system 10 contemplates wireless communications taking place using any appropriate techniques. Thus transceiver station 18 may receive information from mobile units 12 using any suitable protocols and then generate graded packets encoding the information and associated metrics. This information may include digital data, packets, voice information, control signals, video, telemetry data, and/or other suitable information. In addition, selection information, such as tables 44 and 46, may be maintained in any suitable form enabling centralized or distributed management of selection group information. Furthermore, as is described in further detail below, routers 42 may selectively combine information from one or more packets to create one or more new packets.

For outbound communications, managed network 14 may use hierarchy 40 to distribute copies of outbound packets to each transceiver station 18 communicating with mobile unit 12. For example, consider a single outbound packet for transmission to mobile unit I received by router A. Router A accesses selection group information, such as information stored in first table 44, determines that routers B, C, and D are in the next level of hierarchy 40, and forwards copies of the outbound packet to these routers 42. Similarly, routers B, C, and D each access selection group information and, based on this information, forward copies of the outbound packet to appropriate recipients. Thus, for this example, router B forwards copies of the outbound packet to stations E and F, router C forwards the outbound packet to station G, and router D forwards the outbound packet to station H. Thus, stations E, F, G, and H may each communicate a copy of the outbound packet to mobile unit I.

Therefore, when roaming, mobile unit I may receive a copy of each outbound packet from multiple transceiver stations 18. As previously discussed, mobile unit I may then select between the copies of each packet using any suitable selection criteria. For example, mobile unit I may select between copies based on signal strengths of wireless links with transceiver stations 18. Moreover, mobile unit I may combine information from each copy of a packet received to construct a more accurate packet than any of the individual copies. However, system 10 contemplates mobile units 12 using any suitable techniques and criteria to select between and/or combine multiple copies of received packets.

In addition, while this example illustrates managed network 14 using hierarchy 40 to distribute copies of outbound packets, system 10 contemplates using any suitable techniques or information to facilitate the distribution of copies of outbound packets to multiple transceiver stations 18. For example, managed network 14 may use different information, hierarchies, techniques, or groups to distribute outbound packets than are used for selecting between inbound packets.

Figure 5:
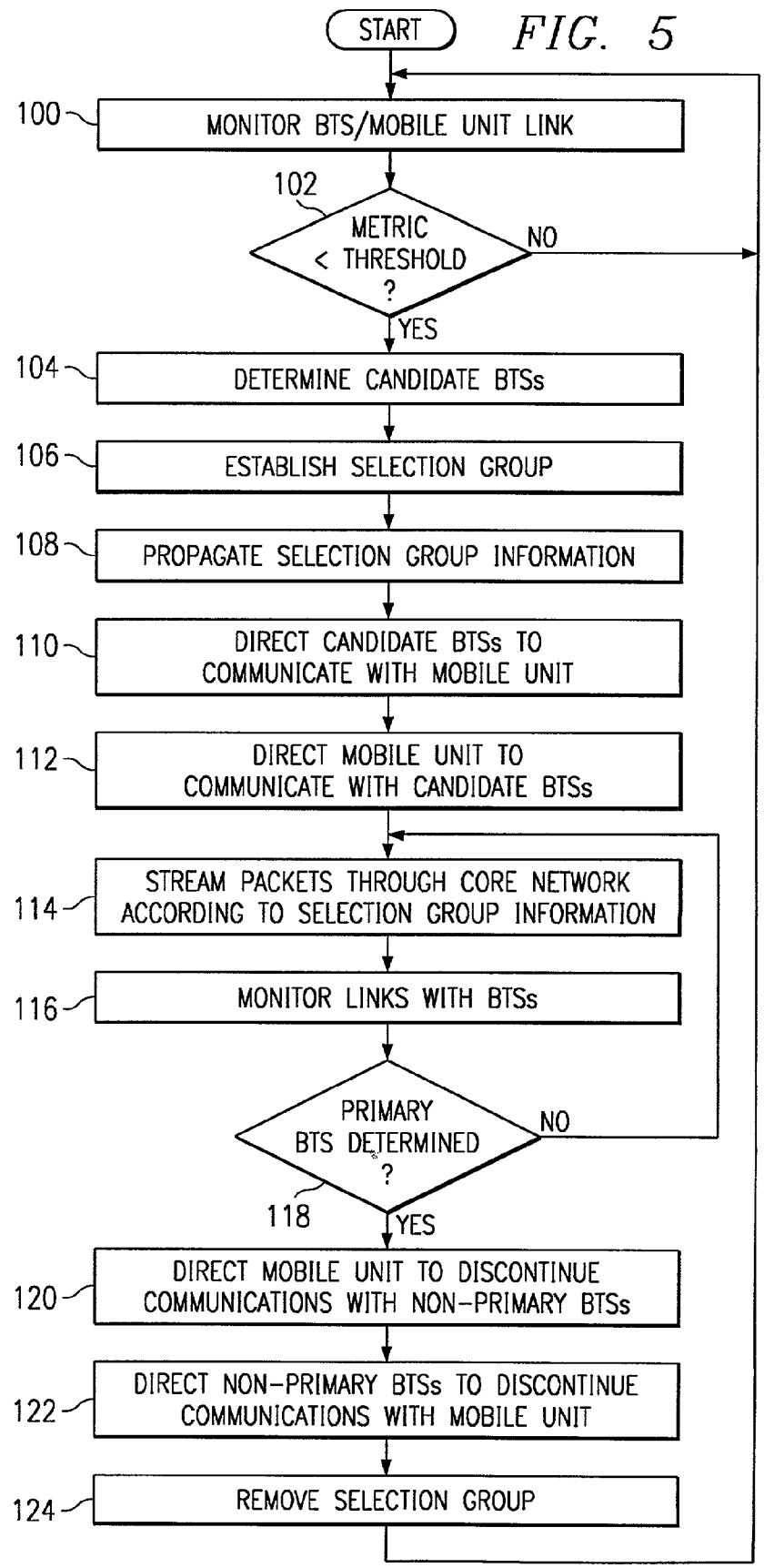
FIG. 5 illustrates an exemplary method for communicating packets using selection groups.

FIG. 5 illustrates an exemplary method for monitoring wireless links between mobile unit 12 and transceiver stations 18 and for establishing a selection group to facilitate roaming of mobile unit 12 between transceiver stations 18. Initially, mobile unit 12 establishes a communications session using a wireless link with transceiver station 18. Roam manager 24 monitors metrics for the wireless link between transceiver station 18 and mobile unit 12 at step 100. As previously discussed, roam manager 24 may monitor any suitable metrics for determining characteristics of the wireless communications link and may also access link table 30, or roam manager 24 may receive reports or requests from mobile unit 12 or transceiver stations 18 to initiate roaming. Roam manager 24 determines whether the metrics have fallen below a threshold at step 102. If not, roam manager 24 continues monitoring the link at step 100. However, if the metrics fall below a threshold, roam manager 24 initiates roaming of mobile unit 12 beginning at step 104.

As part of initiating roaming, roam manager 24 determines candidate transceiver stations 18 at step 104. As previously discussed, candidate transceiver stations 18 may, for example, include transceiver stations 18 in physical proximity to the current transceiver station 18 communicating with mobile unit 12. To determine candidate transceiver stations 18, roam manager 24 may access candidate table 28.

However, system 10 contemplates roam manager 24 determining candidate transceiver stations 18 using any suitable equipment and/or methods, such as responsive to requests or commands from mobile unit 12 or transceiver stations 18. Roam manager 24 then establishes a selection group including the current transceiver station 18 communicating with mobile unit 12 and candidate transceiver stations 18 at step 106. This may include, for example, determining a metric for use in selecting between redundant packets received from multiple locations. Roam manager 24 propagates selection group information to elements in managed network 14 at step 108. This propagation establishes the hierarchical structure, as illustrated by hierarchy 40, for selecting between redundant packets received by multiple transceiver stations 18. By determining candidate transceiver stations 18, establishing a selection group, and propagating this selection group throughout managed network 14, roam manager 24 establishes a mechanism for receiving copies of packets from mobile unit 12 using multiple transceiver stations 18, streaming these packets through managed network 14, and selecting a single copy of each packet to forward to a remote destination.

Roam manager 24 may also direct the establishment of communications between transceiver stations 18 and mobile unit 12 at steps 110 and 112. At step 110, roam manager 24 directs candidate transceiver stations 18 to communicate with mobile unit 12, thus setting up multiple wireless links between managed network 14 and mobile unit 12. In addition, roam manager 24 directs mobile unit 12 to communicate with candidate transceiver stations 18 at step 112. Because transceiver stations 18 and mobile units 12 may support wireless communications using any suitable wireless communications protocol, roam manager 24 directs communications between transceiver stations 18 and mobile units 12 using the appropriate protocol or protocols.

For example, in a CDMA system, roam manager 24 may instruct transceiver stations 18 to transmit communications to mobile unit 12 using particular Walsh code/frequency combinations and to receive transmission from mobile unit 12 using a particular Walsh code/frequency combination. Similarly, roam manager 24 may instruct mobile unit 12 to receive transmissions using the various Walsh code/frequency combinations assigned to candidate transceiver stations 18. These steps permit mobile unit 12 to establish parallel wireless links with multiple transceiver stations 18 for the communication of packets associated with a communications session.

Accordingly, each transceiver station 18 in the established selection group may receive a copy of each inbound packet transmitted by mobile unit 12. These redundant packets stream through CPN 22 according to the established selection group at step 114. This may include hierarchically selecting between the redundant packets received by multiple transceiver stations 18. The discussion above with respect to hierarchy 40 illustrates exemplary operation of a particular embodiment for streaming packets according to selection group information. However, system 10 contemplates using any suitable techniques for selecting between redundant packets and copying packets to multiple transceiver stations 18.

While the selection group is operating, roam manager 24 monitors links with transceiver stations 18 in the selection group at step 116. Through this monitoring, roam manager 24 may determine whether a selected one of these transceiver stations 18 should be chosen from among the group as the primary transceiver station 18. As previously discussed, roam manager 24 may monitor any suitable metrics associated with wireless links between transceiver stations 18 and mobile unit 12. For example, each transceiver station 18 may continuously, periodically, or sporadically communicate a metric indicating some characteristic associated with wireless communications between that transceiver station 18 and mobile unit 12. Based on these and/or other metrics, roam manager 24 determines whether a selected one of transceiver stations 18 in the selection group should be chosen as a primary transceiver station 18 at step 118. If not, packets continue to stream according to the selection group, and roam manager 24 continues monitoring selection group transceiver stations 18.

However, if roam manager 24 determines a primary transceiver station 18, roam manager 24 may then terminate roaming and remove the selection group associated with mobile unit 12. To terminate roaming, roam manager 24 directs mobile unit 12 to discontinue communications with non-primary transceiver stations 18 at step 120. For example, roam manager 24 may instruct mobile unit 12 to discontinue receiving communications on the Walsh code/frequency combinations assigned to the non-primary transceiver stations 18. Roam manager 24 may also direct the non-primary transceiver stations 18 to discontinue communications with mobile unit 12 at step 122. This may include, for example, roam manager 24 instructing these transceiver stations 18 to discontinue transmitting outbound packets to mobile unit 12 and to discontinue receiving inbound packets on the Walsh code/frequency combination assigned to mobile unit 12.

In addition, roam manager 24 removes the selection group associated with mobile unit 12 at step 124. To remove the selection group, roam manager 24 may propagate a command through managed network 14. For example, roam manager 24 may instruct elements of managed network 14 to discard selection group information and to discontinue selecting between packets from mobile unit 12 based on the selection group information. After removing the selection group and terminating roaming, roam manager 24 returns to monitoring the remaining wireless link between transceiver station 18 and mobile unit 12.

While this flowchart illustrates an exemplary method, system 10 contemplates using any suitable techniques and equipment for managing roaming of mobile unit 12. As previously discussed, this includes the distribution or centralization of decision making components. For example, many of the steps performed by roam manager 24 may be implemented by various components within system 10, such as transceiver stations 18, gateways 20, or other suitable equipment. In addition, while this flowchart illustrates the establishment of a static selection group, system 10 contemplates using soft roaming and dynamic selection groups as described above. Also, many of the steps in this flowchart may take place simultaneously and/or in different orders than as shown. Furthermore, system 10 contemplates using methods with additional steps, fewer steps, or different steps, so long as the methods remain appropriate for establishing selection groups to select between redundant packets received.

Figure 6:
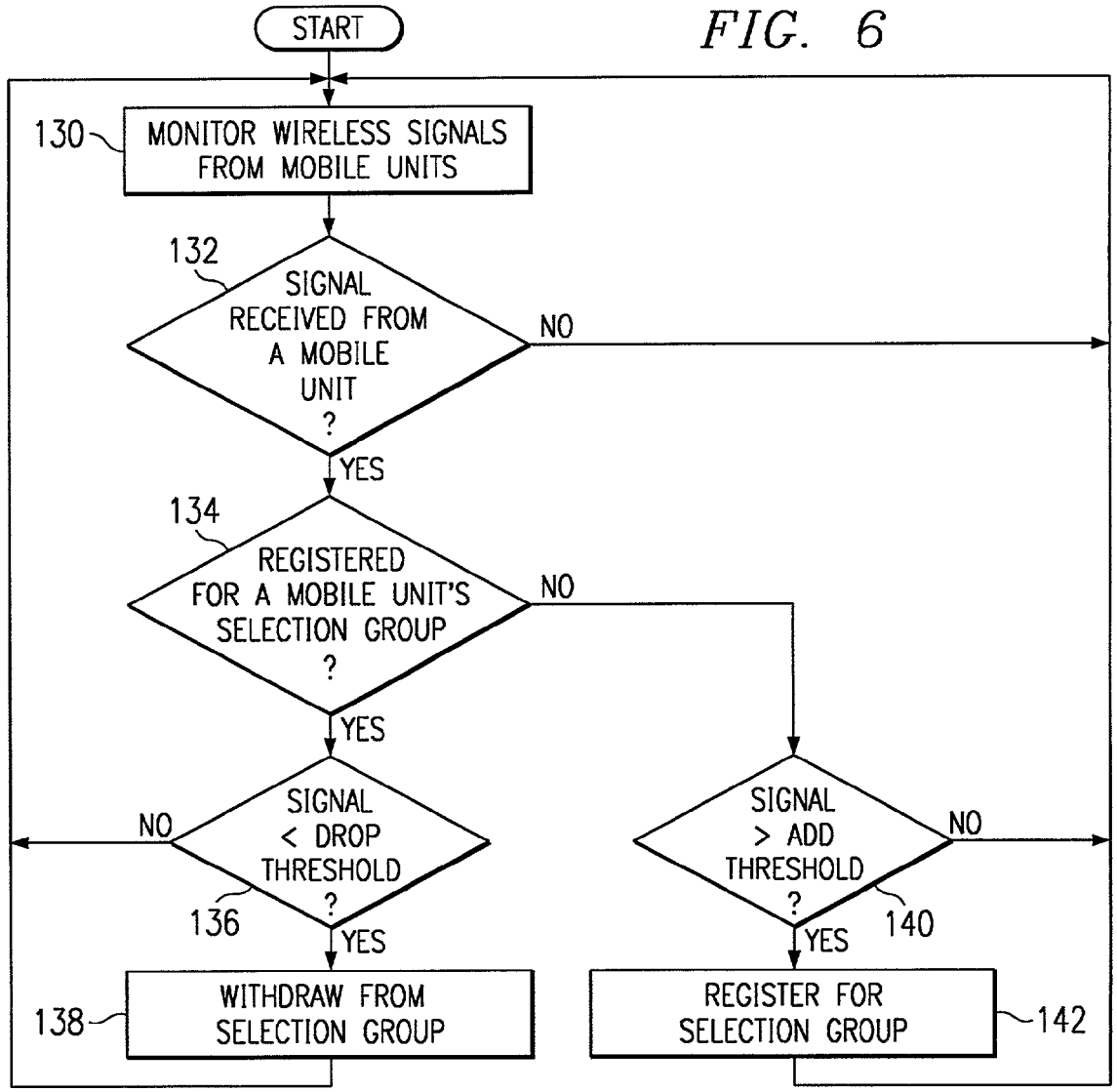
FIG. 6 illustrates an exemplary method for registering and withdrawing from selection groups associated with mobile units.

FIG. 6 illustrates an exemplary method for registering and withdrawing from selection groups associated with mobile units. For the description of this flowchart, transceiver station 18 performs each of the steps. However, system 10 contemplates any of the components of system 10, such as roam manager 24, performing some or all of the steps described.

Transceiver station 18 monitors wireless signals from mobile units 12 at step 130. This includes transceiver station 18 monitoring control channels, communications sessions, and/or other transmissions from mobile units 12. For example, transceiver station 18 may attempt to receive any signals from mobile units 12 that wireless interface 64 of transceiver station 18 detects. Transceiver station 18 determines whether any signals have been received at step 132 and, if not, continues monitoring signals at step 130. However, if a signal has been received from mobile unit 12, transceiver station 18 determines whether it is currently registered for the selection group for that mobile unit 12 at step 134.

If transceiver station 18 is registered for the selection group associated with mobile unit 12, transceiver station 18 determines whether to remain in the selection group. Thus transceiver station 18 determines whether the signal indicates that wireless communications have dropped below a drop threshold at step 136. To satisfy this determination, transceiver station 18 may delay until multiple signals below the drop threshold have been received or until signals have fallen below the drop threshold for a predetermined period of time. Alternatively, transceiver station 18 may determine whether it has ceased receiving any signals from mobile unit 12. However, if the signal (or signals) have not dropped below the drop threshold, transceiver station 18 resumes monitoring signals at step 130.

If the signal has dropped below the drop threshold, transceiver station 18 withdraws from the selection group associated with mobile unit 12 at step 138 and then resumes monitoring signals. After withdrawing from the selection group, transceiver station 18 ceases to participate as a link for communications sessions established by mobile unit 12. That is, for communications sessions established by mobile unit 12 with remote devices, transceiver station 18 will not forward inbound or outbound communications. For example, in a CDMA system, transceiver station 18 may discontinue receiving session communications from mobile unit 12 on a Walsh code/frequency combination associated with transmissions from mobile unit 12. Transceiver station 18 may also instruct mobile unit 12 to discontinue receiving communications from transceiver station 18 on a particular Walsh code/frequency combination.

If transceiver station 18 determines that it is not registered for the selection group associated with mobile unit 12 at step 134, transceiver station 18 determines whether to register as a member of the selection group. Thus transceiver station 18 determines whether the signal indicates that wireless communications have exceeded an add threshold at step 140. As with the drop threshold, transceiver station 18 may delay until multiple signals above the add threshold have been received or until signals have exceeded the add threshold for a predetermined period of time. If not, transceiver station 18 resumes monitoring signals at step 130.

However, if the signal (or signals) have exceeded the add threshold, transceiver station 18 registers for the selection group associated with mobile unit 12 at step 142 and then resumes monitoring signals at step 130. As a member of the selection group, transceiver station 18 participates as a link in communications sessions, such as telephone calls, established by mobile unit 12 with remote devices. For example, in a CDMA system, transceiver station 18 may begin receiving session communications from mobile unit 12 on a Walsh code/frequency combination associated with transmissions from mobile unit 12. Transceiver station 18 may also instruct mobile unit 12 to begin receiving communications from transceiver station 18 on a particular Walsh code/frequency combination.

While this flowchart illustrates an exemplary method, system 10 contemplates using any suitable techniques and equipment for managing membership, registration, and removal from selection groups associated with mobile units 12. For example, many of the steps in this flowchart may be performed by components other than transceiver station 18. Moreover, many of the steps in this flowchart may take place simultaneously and/or in different orders than as shown. In addition, system 10 contemplates using methods with additional steps, fewer steps, or different steps, so long as the methods remain appropriate for managing membership of, registration to, and removal from selection groups associated with mobile units 12.

Figure 7:
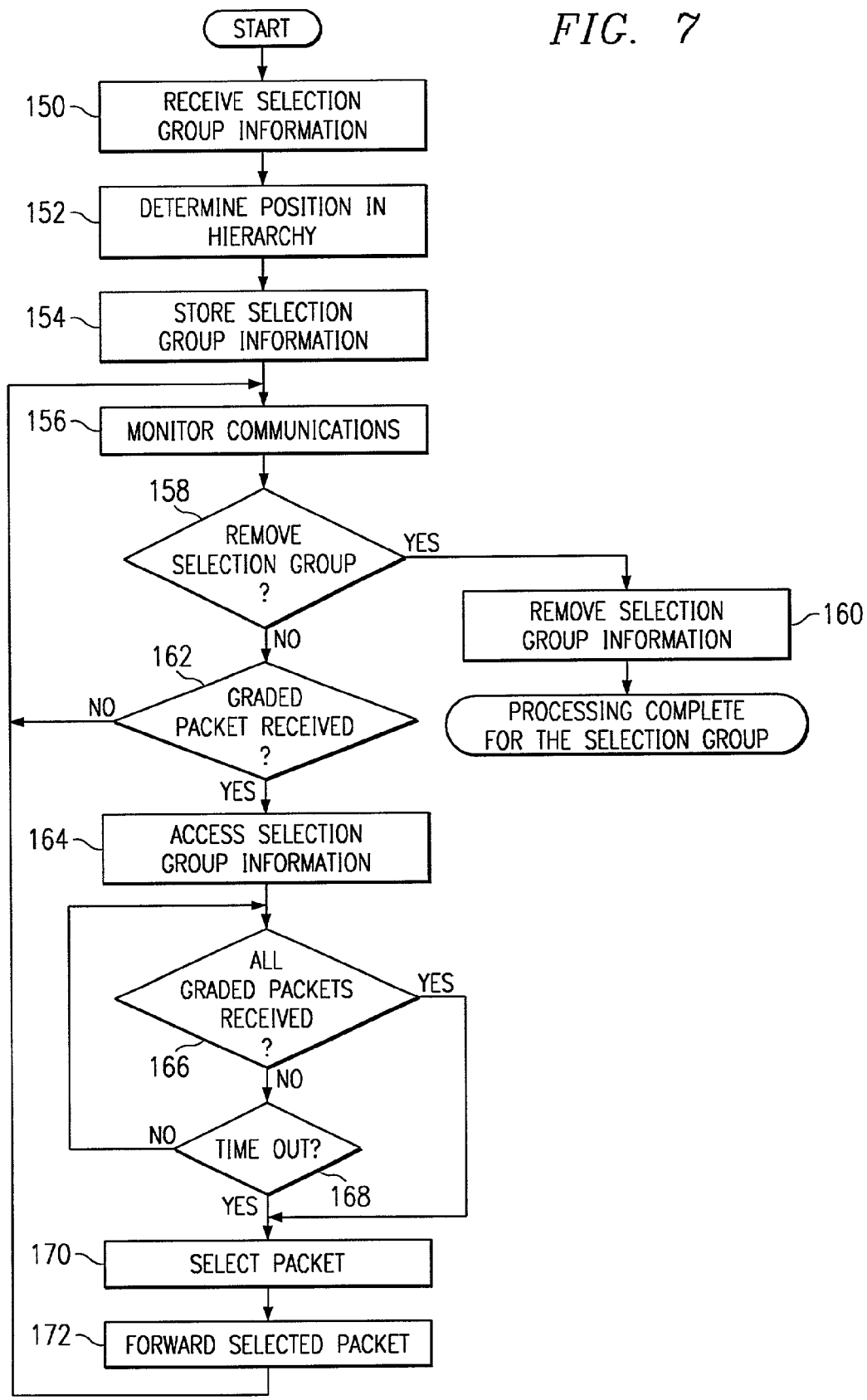
FIG. 7 illustrates an exemplary method for participating in a packet voting selection group hierarchy.

FIG. 7 illustrates an exemplary method for an element in managed network 14 to participate in a selection group hierarchy. This exemplary description focuses on the operation of a particular router 42 in managed network 14; however, any other appropriate device may be used. Router 42 receives selection group information from roam manager 24 at step 150. This information may include data such as a mobile unit 12 associated with the selection group, transceiver stations 18 in the selection group, a metric or other appropriate technique to use in selecting between packets, or other suitable information. Based on this information and network topology information, router 42 may determine an appropriate position in a selection group hierarchy at step 152. For example, router 42 may determine a single network address for the next higher level in a hierarchy and multiple network addresses for the next lower level of the hierarchy. As routers 42 in managed network 14 perform these determinations, they may form a packet voting hierarchy similar to hierarchy 40 discussed above. Router 42 may then store the selection group information, including any network addresses, using any appropriate methods and devices at step 154.

Router 42 monitors communications from other components in system 10 at step 156. Router 42 determines whether an indication to remove the selection group has been received at step 158. If so, router 42 removes the selection group information and completes processing of this selection group. If the selection group has not been removed, router 42 determines whether a graded packet originating from mobile unit 12 has been received at step 162. Upon receiving a copy of an inbound packet in the form of a graded packet, router 42 may then access selection group information at step 164. In this step, router 42 may determine how many copies of the inbound packet should be received before selecting and forwarding one of the graded packets. Router 42 may access packet identifiers, such as a sequence numbers, to determine the group of packets from which to select. Thus, router 42 determines whether all copies of this inbound packet have been received at step 166. If not, router 42 determines whether to continue waiting for all expected graded packets at step 168.

If the timeout has not been reached and all of the graded packets have not been received, router 42 continues checking for graded packets at step 166. However, upon timing out or receiving all expected graded packets, router 42 selects one of the graded packets at step 170. This includes router 42 comparing metrics encoded in the graded packets or using any other suitable technique for selecting between the graded packets. If a timeout has occurred, router 42 may also generate an error message. Router 42 then forwards the selected packet to the component in the next level up in the selection group hierarchy at step 172 and then continues monitoring communications at step 156.

While this flowchart illustrates an exemplary method, system 10 contemplates using any suitable techniques and equipment for packet voting among redundant packets. Moreover, many of the steps in this flowchart may take place simultaneously and/or in different orders than as shown. In addition, system 10 contemplates using methods with additional steps, fewer steps, or different steps, so long as the methods remain appropriate for packet voting among redundant packets.

In the exemplary method described above, router 42 (or any other appropriate network device) receives one or more graded packets and selects a single packet at step 170 based on the metrics encoded in the graded or another appropriate selection technique. However, router 42 may also be configured to select none of the packets or to select more than one packet at step 170. For example, if all of the packets that are received at router 42 do not meet a specified threshold value according to the metric used to grade the packets (such as signal strength or BER), then router 42 may select none of the packets. Furthermore, as is described in further detail below, router 42 may use information about the probable content included in the packets and/or the possible content that may be included in the packets to select which packet or packets to forward. If this information indicates that the content included in all of the packets is likely in error (for example, due to transmission errors) then router 42 may select none of the packets.

Alternatively, if more than one of the packets that are received at router 42 meet a specified threshold according to the metric used to grade the packets, then router 42 may select multiple packets at step 170. Router 42 may also select multiple packets if each of the packets has an identical or substantially identical grade. Furthermore, multiple packets may be selected if router 42 determines that the content included in each of the multiple packets is likely correct. The determination of whether a particular router 42 may forward multiple packets may be based on the position of the router 42 in the selection group hierarchy. For example, it may not be advantageous to forward multiple packets from a router at the top of a hierarchy since this may result in the destination device receiving multiple copies of the same packet (although the packets may have differences due to transmission errors). However, it may be desirable to forward multiple packets from lower-level routers 42 in the hierarchy. For example, a higher-level router 42 may perform packet selection, at least in part, based on a comparison of the relative content of the received packets. Therefore, the selection process may be improved by the forwarding of multiple packets from a lower-level router 42.

For instance, a higher level router 42 may determine which packet to select by comparing the content in a number of packets. If the higher level router 42 receives a first packet and a second packet having the same content from a first lower-level router 42 (for example, because both packets meet a specified threshold) and receives a third packet having different content from a second lower-level router 42, then the higher-level router may determine that the third packet is in error and not select it for forwarding. If only the first packet had been selected and forwarded from the first lower-level router 42, then the higher-level router 42 would not have received packets with the same or similar content and been able to make such a determination. For these and other reasons, it may be desirable when using certain packet selection techniques for selected routers 42 to select and forward all packets that the routers 42 determine to meet a selected standard (for example, all packets that have a BER below a certain level and/or all packets that have an associated signal strength above a certain level).

In addition or instead of selecting packets based on their relative content, a router 42 may also select one or more packets based on a comparison between the content of each packet and an expected content. For example, the content of a packet may be compared to the content of a previously received packet in a temporally encoded packet stream in which the content of the packet may be expressed in relation to the content in the previous packet. An example of such temporal encoding is found in a stream of video content encoded using a Moving Picture Experts Group (MPEG) standard. In an MPEG stream, a series of images are transmitted as a combination of entire images (or frames) and reference images. For example, a packet including an entire image may include data representing all of the pixels in an image. A packet including a reference image includes data that can be used to recreate an image based on data in one or more pervious or subsequent packets.

MPEG encoding is an efficient way of communicating video data since sequential images in a video stream may differ only slightly. Therefore, it is inefficient to transmit data representing every image in its entirety. For example, the content of one packet in an MPEG stream may include data representing all of the pixels of an image. However, the content of the next packet in the stream may only indicate that a pixel in the previous image should be turned "off". Therefore, the only difference between the two images is that the pixel is turned "on" in the first image and turned off in the second image. Many other techniques for identifying differences between images may be used with MPEG encoding and are well known in the art.

The use of temporal relationships in MPEG encoding may be used in conjunction with communications system 10 of the present invention to select one or more redundant packets from a mobile unit 12. Such selection may be based on whether the content of a packet in an MPEG stream is consistent with the content in one or more previous and/or subsequent packets. For example, if a packet in one of a number of redundant MPEG streams from a mobile unit 12 indicates that a particular pixel in an image should be turned on and the previous packet or packets in the MPEG stream already indicated that the pixel should be turned on (and have not indicated that the pixel be turned off), then a router 42 or other appropriate network device may conclude that the newly received packet is in error and discard the packet. Therefore, the router 42 may select a redundant packet in a redundant MPEG stream (from a different transceiver station 18) that does not contradict the earlier packets.

Furthermore, instead of discarding a packet based on a single inconsistency, a router 42 or other appropriate device may maintain a temporal buffer to track the consistency of the content in a series of packets in an MPEG stream. Such a buffer may store information regarding N slots of time for each of the sources of information (each of the redundant MPEG streams from mobile unit 12). At each time slot, router 42 may compute the probability that the content received at that time slot is correct. After an Nth packet is received, router 42 may make a selection between redundant packets received N time slots before using these probabilities. Therefore, there is an N packet delay introduced at such a selection point. In such a process, the value for N may be any appropriate number and may be "tuned" for a particular network.

This temporal buffering process is typically more accurate than a process in which a selection decision is made between a number of redundant packets at the time the packets are received. This is because the larger number of time slots that are "tracked" after a particular set of redundant packets is received, the better router 42 is able to determine if each of the packets actually includes inconsistent information. For example, router 42 may initially determine that content indicating that a pixel should be turned on is probably incorrect based on inconsistencies with previous content that has been received. However, subsequent content may indicate that the previous content was actually incorrect and thus the indication that the pixel should be turned on was not (or probably not inconsistent). With the updated information, router 42 may then make a better packet selection decision.

It should be noted that although MPEG encoding is described above, packet selection based on an expected content may be used in conjunction with any other type of temporal encoding. Furthermore, such selection techniques may be used for selection of packets in packet stream that may only include particular types of content. For example, control information often has a limited number of states that can be represented in the content of a packet. These states may be further limited by the states represented in previous packets (thus the states are temporally related). Therefore, redundant control packets may be discarded in a packet selection process if the packets include an "impossible" state (either because such a state does not exist or because the state cannot exist in light of a previous state or states).

FIG. 8 illustrates an exemplary method of selecting one or more packets based on an expected content or based on the relative content of the packets. The exemplary method begins at step 180 where a selection group of one or more routers 42 is formed (or an existing selection group is reconfigured by adding or deleting routers 42) for a mobile unit 12 or other appropriate device. At step 182, the routers 42 in the selection group are configured to perform packet selection according to an appropriate selection technique. This selection technique may include a comparison of the relative content of multiple redundant packets and/or a comparison of the content of each redundant packet with an expected content, as described above. In addition, packets may be selected (before or after a selection based on content) based on the value of a metric that is used to grade the packets, as described above.

One or more routers 42 in the selection group receive multiple redundant packets from mobile unit 12 (via base transceiver stations 18) at step 184. At step 186, the router or routers 42 receiving the multiple packets select two or more of the redundant packets from mobile unit 12 based on the value of a metric that is used to grade the packets. At step 188, the same router 42 or a different router 42 evaluates the content of the selected packets in accordance the configured selection technique. For example, if the packets are to be selected based on their relative content, then router 42 may compare the content of the packets and select a packet or packets having the most common content at step 190. If the packets are to be selected based on an expected content, the content of each packet is evaluated with respect to the expected content, as described above. In such a case, router 42 may select the packet or packets having a content consistent with the expected content at step 190. The selected packet or packets are communicated directly or indirectly to the destination at step 192. If a change in one or more of the selection groups is received at step 194, then the method returns to step 180. If no change in the selection groups is received, the method returns to step 184.

The exemplary method describes two or more redundant packets being selected based on the value of a metric that is used to grade the packets and then one or more of these selected packets being further selected based on packet content. However, in particular embodiments, two or more redundant packets may first be selected based on packet content and then one or more of these selected packets may be further selected based on the value of the metric. Alternatively, one or more redundant packets may be selected in a single step based on a combination of the value of the metric and the packet content. Moreover, one or more packets may be selected based on packet content and no selection may be made based on the value of the metric. Any of the above selection alternatives may be performed at one or more routers 42.

As can be seen from the foregoing description, each router 42 in the hierarchy may select one or more packets based on the value of a metric (such as signal strength or BER) that is used to grade the packets, based on a comparison of the relative content of multiple packets, based on a comparison of the content of each packet with an expected content, or using any other appropriate selection technique. Furthermore, each router 42 may use any appropriate combination of these techniques to select one or more packets. The particular selection technique or techniques used by routers 42 in a selection group may be specified when the selection group is established, as described in conjunction with FIG. 5, or at any other appropriate time. If different routers 42 in a selection group are to use different selection techniques, then each router 42 may be separately configured when the selection group is formed or at any other appropriate time.

As described above, routers 42 or other appropriate devices are capable of selecting one or more redundant packets and forwarding the selected packets to a destination or other router 42. In this case, the content of each selected packet is not modified before a router 42 forwards the packet. However, instead of forwarding selected packets without modification, routers 42 may combine different portions of two or more redundant packets from a single source to create one or more improved packets or combine the content of two or more packets from different sources to create one or more new packets.

FIG. 9 illustrates an exemplary method of creating an improved packet from two or more redundant packets. The exemplary method begins at step 200 where a selection group of one or more routers 42 is formed (or an existing selection group is reconfigured by adding or deleting routers 42) for a mobile unit 12 or other appropriate device. At step 202, the routers 42 in the selection group are configured to perform packet selection according to an appropriate selection technique, as described above. At step 204, one or more routers 42 that are included in the selection group are configured to evaluate and combine different portions of the content of redundant packets from mobile unit 12 to create one or more improved packets that include the content, as described below. This configuration may include indicating how the content of the packets is to be evaluated and combined.

One or more routers 42 in the selection group receive multiple redundant packets from mobile unit 12 (via base transceiver stations 18) at step 206. At step 208, the router or routers 42 receiving the multiple packets select two or more of the redundant packets from mobile unit 12 using an appropriate selection technique. At step 210, a router 42 evaluates the content of the two or more selected packets to determine which portions of the packets should be combined. Router 42 then combines different portions of the content in the packets to form an improved packet at step 212. As an example only, if two redundant packets are received, router 42 may combine the first half (or any other portion) of the content of the first packet with the second half (or any other portion) of the second packet. For instance, if router 42 determines that the first half of the content in the first packet has been corrupted (through transmission errors or otherwise) and determines that the second half of the second packet has been corrupted, then router 42 may combine the halves of the packets that are uncorrupted to create am improved packet having no errors in its content.

Router 42 may evaluate the content of each incoming packet on a bit-by-bit basis to determine which portions of the packet to include in an improved packet. For example, router 42 may evaluate the first bit of a first and a second packet and select one of the bits to include in the improved packet. Router 42 may then perform the same evaluation and selection on each successive bit of the first and second packets. Alternatively, router 42 may evaluate and select groups of bits or any other appropriate portions of the content of a packet. A router 42 or other appropriate device may evaluate the bits or other portions of the content included in a packet using any appropriate technique. One such technique is to use error correction techniques to determine whether a bit is in error. If a bit from a first redundant packet is in error and the same bit in a second redundant packet is not in error, then router 42 may select the bit from the second packet to include in the improved packet. As described above, this evaluation may be performed on a bit-by-bit basis. Therefore, the router 42 determines the correct value for the bit (or for a set of bits) from one or more other redundant packets. Alternatively, router 42 may interpolate between two bits in a single packet to determine the value of another bit between the two bits that is in error or router 42 may interpolate between corresponding bits in two or more redundant packets.

An exemplary technique that may be used to perform this bit-by-bit evaluation of two redundant packets is to perform an "exclusive-or" (XOR) operation on the two packets. This operation determines those bits that differ between the two packets. For each of those bits, router 42 or other appropriate component may try flipping the bit each way to see if this yields a correct final packet (by using a higher level error check code, such as a frame check sum). If there are more than two redundant packets to choose from, then a majority vote can first be used to select a candidate packet. A procedure can then be performed that XORs the candidate packet with each of the other redundant packets to see where the packets vary.

Furthermore, any other appropriate evaluation technique may be used to select portions of a packet to include in an improved packet containing content from multiple packets received by a router 42. The improved packet is communicated directly or indirectly to the destination at step 214. If a change in one or more of the selection groups is received at step 216, then the method returns to step 200. If no change in the selection groups is received, the method returns to step 206.

Although the combination of content from two redundant packets to form one improved packet is described above, the present invention also contemplates that content or other information from any appropriate number of redundant packets may be combined to create any appropriate number of improved packets. For example, a portion of the content from a first packet and a second packet which are redundant may be combined to create one improved packet and a portion of the content from the second packet and a third packet (which is also redundant) may be combined to create another improved packet. The determination of which portions of which packets are combined may be made using any appropriate technique. Furthermore, the two or more packets selected at step 208 may be selected by the same router 42 that performs evaluating step 210 and combining step 212 or the packets may be selected by one or more different routers 42 and forwarded to the router 42 performing steps 210 and 212. Moreover, it should be noted that selection step 208 may not be performed. In such an embodiment, a router 42 may perform steps 210 and 212 on packets that have not been selected. For example, a router 42 may evaluate the content of all redundant packets that it receives and combine content from two or more of the packets.

Figure 10:
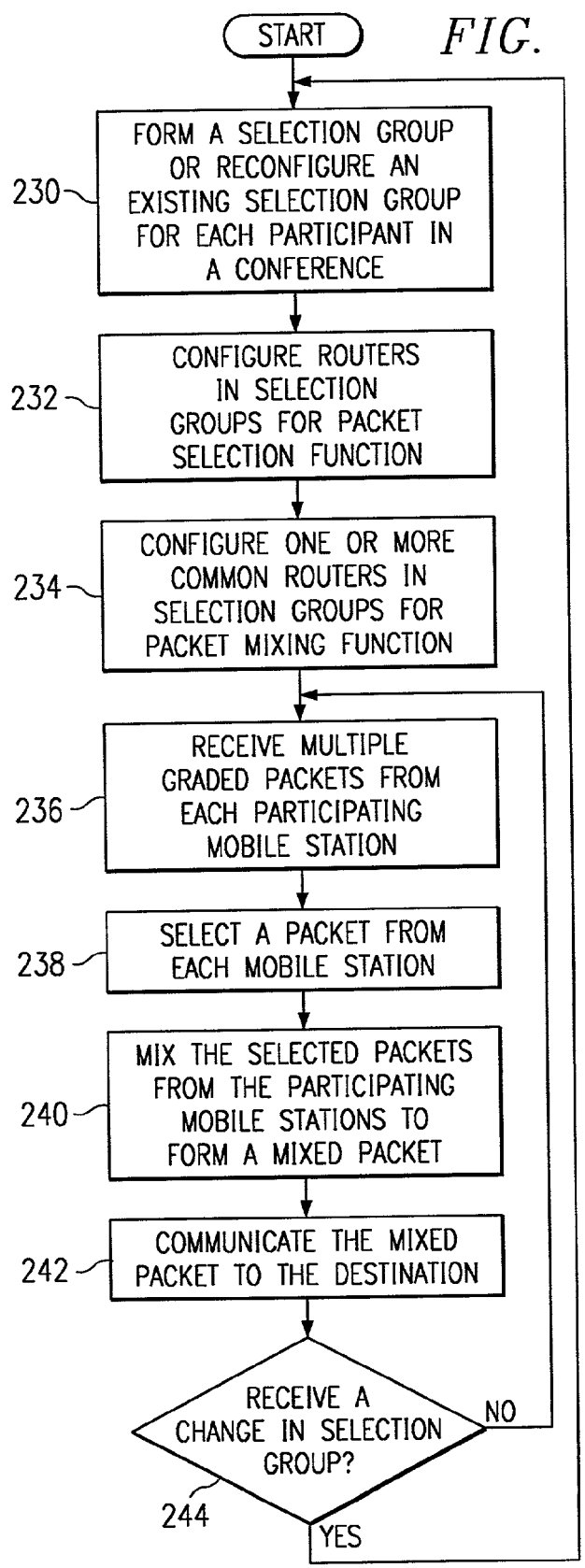
FIG. 10 illustrates an exemplary method of combining content included in packets from different sources.

FIG. 10 illustrates an exemplary method of combining content included in packets from different sources. In addition to or instead of combining different portions of the content from redundant packets from a single source, routers 42 or other appropriate devices may combine the content included in packets from different sources. For example, a router 42 may serve as a conference bridge and mix the content included in packets received from multiple mobile units 12. The packets from the multiple mobile units 12 may be identified such that router 42 may determine which packets are to be mixed. Router 42 may perform this mixing function in addition to the packet selection function described above.

The exemplary method begins at step 230 when a selection group of one or more routers 42 is formed (or an existing selection group is reconfigured by adding or deleting routers 42) for each mobile unit 12 or other participant in a conference or other communication session in which communications from multiple sources are to be mixed. At step 232, the routers 42 in each selection group are configured to perform packet selection according to an appropriate selection technique, as described above. At step 234, one or more routers 42 that are included in multiple selection groups are configured to mix packets from the mobile units 12 with which the selection groups are associated. This configuration includes indicating to routers 42 the mobile units 12 from which packets are to be mixed and the mixing technique that routers 42 should use.

One or more routers 42 in each selection group receive multiple redundant packets from each mobile unit 12 participating in the conference (via base transceiver stations 18) at step 236. At step 238, routers 42 receiving the multiple packets select one or more of the redundant packets from each mobile unit 12 using an appropriate selection technique. In an exemplary embodiment, this selection process continues until a single redundant packet from each mobile unit 12 is selected. This exemplary selection process may be performed by a single router 42 or by a series of routers 42 that narrow down the number of redundant packets until a single packet is selected. Furthermore, the selected packet may be an improved packet that has been created from the content of two or more redundant packets, as described above. Packets may be selected using any appropriate technique. For example, a router 42 may select packets to combine based on the value of a metric, an evaluation of the packet content, and/or any other appropriate selection technique.

At step 240, the selected packet or packets from each participating mobile unit 12 are mixed to form a mixed packet. Mixing of the content of multiple packets (and the determination of which packets are to be mixed) may be performed using any appropriate technique. For example, corresponding packets from each mobile unit 12 (for example, packets that were communicated from mobile units 12 at substantially the same time) may be mixed using techniques used for voice over IP (VoIP) conference calls. Mixing step 240 may be performed by a single router 42 or by multiple routers 42. As an example only, if three mobile units 12, each having an associated selection group, are participating in a conference, a single high-level router 42 may be a member of all three selection groups and thus may be the only router 42 that mixes packets from the three mobile units 12. Lower-level routers 42 may perform packet selection and send one or more redundant packets from each mobile unit 12 to the high-level router 42. The high-level router 42 may then select one packet from each mobile unit 12 (assuming that the high-level router 42 received more than one redundant packet) and then mix a packet from each of the three mobile units 12 to form a mixed packet.

Alternatively, all of the selection groups may not share a common router 42 or a single router 42 that is included in all of the selection groups may not be appropriate for mixing packets from all of the mobile units 12 (due to the router's position in one or more of the hierarchies or for any other reason). In such cases, multiple routers 42 may be used to mix the packets into a single packet including the mixed content of all participating mobile units 12. For example, a first router 42 included in the selection groups associated with a first mobile unit 12 and a second mobile unit 12 may mix the content of selected packets from the first and second mobile units. A second router 42 in a selection group associated with a third mobile unit 12 may receive the mixed packet from the first router 42 (either directly or indirectly). The second router 42 may then mix the contents of a selected packet from the third mobile unit 12 with the mixed packet received from the first router 42 to created a new mixed packet that includes the mixed content of the first, second, and third mobile units 12.

The mixed packet including the mixed content of all participating mobile units (assuming each mobile unit 12 has communicated content to be mixed) is communicated directly or indirectly to the destination at step 242. If a change in one or more of the selection groups is received at step 244, then the method returns to step 230. If no change in the selection groups is received, the method returns to step 236.

Although the present invention has been described in several embodiments, numerous changes and modifications may be suggested to one skilled in the art, and it is intended that the present invention encompass such changes and modifications as fall within the scope of the present appended claims.

What is claimed is:

1. A communications system, comprising:
    a first mobile unit operable to transmit a first content, wherein the first content comprises voice content received from a user of the first mobile unit;
    a second mobile unit operable to transmit a second content, wherein the second content comprises voice content received from a user of the second mobile unit, the first and second mobile units participating in a conference call;
    a plurality of base transceiver stations, each base transceiver station operable to:
        receive the content from at least one of the mobile units;
        determine a value for a metric associated with communications between the mobile unit and the base transceiver station;
        generate a graded packet including the value and the content; and
        communicate the graded packet; and
    one or more routers collectively operable to:
        receive a plurality of first graded packets including the first content and a plurality of second graded packets including the second content;
        select one of the first graded packets based on the values included in the first graded packets;

select one of the second graded packets based on the
   values included in the second graded packets;
mix the first content of the selected first graded packet
   and the second content of the selected second graded
   packet to create a mixed packet including the first
   and second contents; and
communicate the mixed packet.

2. A network device, comprising:
an interface operable to:
   receive a plurality of first graded packets from two or
      more of a plurality of base transceiver stations,
      wherein the first graded packets include a first con-
      tent received from a first mobile unit and a value for
      a metric generated by each base transceiver station,
      the metric associated with communications between
      the first mobile unit and the base transceiver station,
      wherein the first content comprises voice content
      received from a user of the first mobile unit;
   receive a plurality of second graded packets from two
      or more of the plurality of base transceiver stations,
      wherein the second graded packets include a second
      content received from a second mobile unit and a
      value for a metric generated by each base transceiver
      station, the metric associated with communications
      between the second mobile unit and the base trans-
      ceiver station, wherein the second content comprises
      voice content received from a user of the second
      mobile unit, the first and second mobile units par-
      ticipating in a conference call;
a processor operable to:
   select one of the first graded packets based on the
      values included in the first graded packets;
   select one of the second graded packets based on the
      values included in the second graded packets;
   mix the first content of the selected first graded packet
      and the second content of the selected second graded
      packet to create a mixed packet including the first
      and second contents; and
   communicate the mixed packet.

3. A method for mixing packets, comprising:
receiving a plurality of first graded packets from two or
   more of a plurality of base transceiver stations, wherein
   the first graded packets include a first content received
   from a first mobile unit and a value for a metric
   generated by each base transceiver station, the metric
   associated with communications between the first
   mobile unit and the base transceiver station, wherein
   the first content comprises voice content received from
   a user of the first mobile unit;
receiving a plurality of second graded packets from two or
   more of the plurality of base transceiver stations,
   wherein the second graded packets include a second
   content received from a second mobile unit and a value
   for a metric generated by each base transceiver station,
   the metric associated with communications between
   the second mobile unit and the base transceiver station,
   wherein the second content comprises voice content
   received from a user of the second mobile unit, the first
   and second mobile units participating in a conference
   call;
selecting one of the first graded packets based on the
   values included in the first graded packets;
selecting one of the second graded packets based on the
   values included in the second graded packets;
mixing the first content of the selected first graded packet
   and the second content of the selected second graded
   packet to create a mixed packet including the first and
   second contents; and
communicating the mixed packet.

4. Software for mixing packets, the software embodied in
a computer-readable medium and operable to:
   receive a plurality of first graded packets from two or
      more of a plurality of base transceiver stations, wherein
      the first graded packets include a first content received
      from a first mobile unit and a value for a metric
      generated by each base transceiver station, the metric
      associated with communications between the first
      mobile unit and the base transceiver station, wherein
      the first content comprises voice content received from
      a user of the first mobile unit;
   receive a plurality of second graded packets from two or
      more of the plurality of base transceiver stations,
      wherein the second graded packets include a second
      content received from a second mobile unit and a value
      for a metric generated by each base transceiver station,
      the metric associated with communications between
      the second mobile unit and the base transceiver station,
      wherein the second content comprises voice content
      received from a user of the second mobile unit, the first
      and second mobile units participating in a conference
      call;
   select one of the first graded packets based on the values
      included in the first graded packets;
   select one of the second graded packets based on the
      values included in the second graded packets;
   mix the first content of the selected first graded packet and
      the second content of the selected second graded packet
      to create a mixed packet including the first and second
      contents; and
   communicate the mixed packet.

5. A network device, comprising:
means for receiving a plurality of first graded packets
   from two or more of a plurality of base transceiver
   stations, wherein the first graded packets include a first
   content received from a first mobile unit and a value for
   a metric generated by each base transceiver station, the
   metric associated with communications between the
   first mobile unit and the base transceiver station,
   wherein the first content comprises voice content
   received from a user of the first mobile unit;
means for receiving a plurality of second graded packets
   from two or more of the plurality of base transceiver
   stations, wherein the second graded packets include a
   second content received from a second mobile unit and
   a value for a metric generated by each base transceiver
   station, the metric associated with communications
   between the second mobile unit and the base trans-
   ceiver station, wherein the second content comprises
   voice content received from a user of the second mobile
   unit, the first and second mobile units participating in
   a conference call;
means for selecting one of the first graded packets based
   on the values included in the first graded packets;
means for selecting one of the second graded packets
   based on the values included in the second graded
   packets;
means for mixing the first content of the selected first
   graded packet and the second content of the selected
   second graded packet to create a mixed packet includ-
   ing the first and second contents; and
means for communicating the mixed packet.

* * * * *